United States Patent
Cates

(10) Patent No.: US 11,910,801 B2
(45) Date of Patent: Feb. 27, 2024

(54) METHOD OF DEHYDRATING WINE GRAPES AND OTHER FOODS

(71) Applicant: RIVERHALL CAPITAL LLC, Fernandina Beach, FL (US)

(72) Inventor: Christopher Upton Cates, Atlanta, GA (US)

(73) Assignee: Riverhall Capital, LLC, Atlanta, GA (US)

( * ) Notice: Subject to any disclaimer, the term of this patent is extended or adjusted under 35 U.S.C. 154(b) by 0 days.

(21) Appl. No.: 18/049,100

(22) Filed: Oct. 24, 2022

(65) Prior Publication Data
US 2023/0076742 A1 Mar. 9, 2023

Related U.S. Application Data

(63) Continuation of application No. 15/179,217, filed on Jun. 10, 2016, now abandoned.

(60) Provisional application No. 62/173,506, filed on Jun. 10, 2015.

(51) Int. Cl.
| | | |
|---|---|---|
| A23B 7/005 | (2006.01) | |
| A23B 7/02 | (2006.01) | |
| A23L 19/00 | (2016.01) | |

(52) U.S. Cl.
CPC ............ *A23B 7/005* (2013.01); *A23B 7/0053* (2013.01); *A23B 7/0205* (2013.01); *A23L 19/03* (2016.08); *A23V 2002/00* (2013.01)

(58) Field of Classification Search
CPC ..... A23B 7/0205; A23B 7/005; A23B 7/0053; A23L 19/03
See application file for complete search history.

(56) References Cited

U.S. PATENT DOCUMENTS

| | | |
|---|---|---|
| 3,806,610 A | 4/1974 | Rahman |
| 4,364,968 A | 12/1982 | Waitman et al. |
| 5,000,972 A | 3/1991 | Nafisi-Movaghar |
| 5,256,438 A | 10/1993 | Lewis et al. |
| 5,362,503 A | 11/1994 | Burri et al. |
| 5,962,057 A | 10/1999 | Durance et al. |
| 2010/0196552 A1 | 8/2010 | Giannini |
| 2011/0091616 A1 | 4/2011 | Jimenez Mendoza |

FOREIGN PATENT DOCUMENTS

| | | |
|---|---|---|
| FR | 2651644 A1 | 3/1991 |
| RU | 2088125 C1 * | 8/1997 |
| SU | 1355173 A | 11/1987 |
| SU | 1606004 A1 | 11/1990 |

OTHER PUBLICATIONS

SU1355173 machine translation Google Patents https://patents.google.com/patent/SU1355173A1/en?oq=SU1355173 (Year: 1978).*
Thakur et al (Drying of 'Perlette' grape under different physical treatment for raisin making). Oct. 9, 2010 https://www.ncbi.nlm.nih.gov/pmc/articles/PMC3551147/pdf/13197_201_O_Article_95.pdf (Year: 2010).
Peacock et al "The future of California raisins is drying on the vine" http://iv.ucdavis.edu/files/24385.pdf California Agriculture, vol. 59, No. 2, pp. 70-74 (Year: 2005).
Calraisins "The California Raisin Industry" pp. 1-2 Mar. 28, 2014 https://calraisins.org/about/the-raisin-industry/ (Year: 2014).
MojavegoldLLC "Raisins on the Vine" pp. May 1-2, 17, 2014 http:l/web.archive.org/web/20140517160251/https://www.mojavegoldllc.com/ (Year: 2014).
Ecobotanica pp. 1-2 Feb. 25, 2014 http://ecobotanica.com.au/Drying-Your-Own-Grapes-bgp1349.html date obtained from internet archive http://web.archive.org/web/20140225204943/http://www.ecobotanica.corn.au/Drying-Your-Own-Grapes-bgp 1349. html (Year: 2014).
Royal Nut Company "Muscatel Clusters" pp. 1-2 Jul. 16, 2014 http:l/web.archive.org/web/20140716220053/https://www.royalnutcompany.com .au/dried-fruit/all-dried-fruit/muscatel-clusters (Year: 2014).
Brennan, Linda "Drying Your Own Grapes" pp. 1-2 Ecobotanica Feb. 25, 2014 http://ecobotanica.com.au/Drying-Your-Own-Grapes-bgp1349.html (Year: 2014).
Memidex Free Online Dictionary "muscat" pp. 1-4 http://www.memidex.com/muscat+vitis-vinifera printed Nov. 18, 2019 (Year: 2019).
McCarty, Kristen "How Does a Food Dehydrator Work?" Dec. 2013 pp. 1-4 https://www.livestrong.com/article/191703-how-does-a-food-dehydrator-work/ (Year: 2013).

(Continued)

*Primary Examiner* — Vera Stulii
(74) *Attorney, Agent, or Firm* — Perilla Knox & Hildebrandt LLP; Kenneth A. Knox

(57) ABSTRACT

A method of dehydrating fruit, comprising providing at least one cluster of fruit attached to stems and the stems attached to a branch; a first heating step comprising heating the least one cluster of fruit at a temperature in a range of 100-200 degrees F. for a period of time in a range of 1-24 hours; and a first curing step comprising allowing the at least one cluster of fruit to cool to room temperature over a period of time whereby dehydrated fruit is obtained.

18 Claims, No Drawings

(56) References Cited

OTHER PUBLICATIONS

Interior Health "Dry It! A Dehydrator Guide for Early Childhood Education" May 2013 pp. 1-27 https://www.interiorhealth.ca/YourHealth/InfantsChildren/Documents/Dry%2011%20Manual.pdf (Year: 2013).

Stormy Stewart "Dehydrating Fruit" Jul. 2011 pp. 1-4 https://www.justapinch.com/recipes/dessert/fruit-dessert/dehydrating-fruit.html (Year: 2011).

Cervin, Michael "The Top 25 Odd-Ball Wines of California" IntoWine Aug. 26, 2014 pp. 1-10 https://www.intowine.corn/top-25-odd-ball-wines-california.

Fabacae_native "Experience with black monukka grape?" Feb. 2012 p. 1 https://www.houzz.com/discussions/1443295/experience-with-black-monukka-grape.

Morinaga, Kunihisa "Chapter 6 Grape Production in Japan" Grape Production in the Asian-Pacific region FAO Jul. 2001 http://www.fao.org/3/x6897e/x6897e07.htm pp. 1-6.

Jess "Seeded vs. Seedless Grapes. Health Benefits of Grape Seeds & Creative Ways To Use Them In Recipes" pp. 1-8 Living Girl Living Foods Mar. 6, 2013 https://livinggirllivingfoods.com/2013/03/06/seeded-vs-seedless-grapes-health-benefits-of-grape-seeds-creative-ways-to-use-them-i n-reci pes-3/ (Year: 2013).

Telkamp, Mick "Homemade Raisins How-To" HGTV pp. 1-3 https://www.hgtv.com/outdoors/gardens/garden-to-table/homemade-raisins-how-to Nov. 6, 2013 (Year: 2013).

Vivapura "Raw Organic Monukka Raisins" pp. 1-7 https://www.vivapura.com/Monukka-Raisins-p/vu-023.htm. date from comments 2013 (Year: 2013).

International Preliminary Report on Patentability for International Patent Application No. PCT/US2016/036930; dated Dec. 12, 2017.

Boyer Using Dehydration to Preserve Fruits, Vegetables, and Meats Virginia Cooperative Extension Jun. 1, 2009 pp. 1-7 http://pubs.ext.vt.edu/348/348-597/348-597.html.

CircleKRanch "Jumbo Cluster Raisins" Circle K Ranch Aug. 31, 2013 p. 1 http://circlekranch.com/index.php?id_product=54&controller=product.

Troftgruben at al "Drying Food" University of Illinois pp. 1-25 Apr. 1984 http://www.aces.uiuc.edu/vista/html_pubs/DRYING/dryfood.html.

FoodReference "Grapes" Food Reference.com Apr. 2014, pp. 1-4 http://www.foodreference.com/html/artgrapes.html.

Search Report and Written Opinion from International Application No. PCT/US2016/036930; dated Sep. 2, 2016 pp. 1-9.

\* cited by examiner

METHOD OF DEHYDRATING WINE GRAPES AND OTHER FOODS

CROSS-REFERENCE TO RELATED APPLICATIONS

This application is a continuation of U.S. patent application Ser. No. 15/179,217, filed on Jun. 10, 2016, entitled "METHOD OF DEHYDRATING WINE GRAPES AND OTHER FOODS," which is herein incorporated by reference, which claims the benefit of and priority to U.S. Provisional Patent Application No. 62/173,506 filed Jun. 10, 2015.

TECHNICAL FIELD

The present disclosure relates to methods of dehydrating wine grapes and other organic materials.

BACKGROUND

Dehydration of food has been practiced for centuries to preserve foods including various fruits and vegetables, and multiple methods of food processing have been used to hasten and extract the water content from these foods in order to improve food durability and avoid the need for refrigeration. These methods have included everything from sun drying to baking in ovens. In general, in dehydration of foods, sufficient dryness with low residual water content (<18-20% residual water content), is required for non-spoilage and in order to prolong non-refrigerated shelf life. In most instances of dehydration, the external integrity of the food or fruit must be disrupted (via slicing, scoring, cutting, puncturing, macerating, or the like) to allow moisture to efficiently escape from the food and hasten the drying and dehydration process. Usually, an external heat source is applied to the food along with air flow across the food's surface to efficiently evaporate liquid material which has oozed out of the food as well as the water from the increased exposed surface area of the food created by surface or skin disruption, in order to achieve the results of dehydration.

Many of the beneficial biochemical nutrient compounds which are in foods (including fruits) are water soluble and therefore can be leached out with the fluid during the drying process. This allows vital important nutrients to be lost in the process of drying and dehydration of the food. It is also generally known from the medical and food science literature that many of the important health benefits and bioavailability nutrient compounds in foods require the complex interaction of many components present only in the intact food matrix or structure found in natural whole foods. The bioavailability (adequate digestion, absorption, and proper utilization by the human body) of these food nutrient compounds requires the presence of an intact food matrix during human consumption. Disruption of the natural food matrix during food processing allows for the loss of important compounds, the inactivation of certain compounds, and disrupts the necessary interaction of certain compounds required for adequate human absorption and bioavailability. During dehydration by traditional dehydration methods, there is loss of important water-soluble nutrient compounds which leads to decreased bioavailability of these bioactive compounds important for the health benefits of certain foods. Therefore, it is generally known that the industrial processing of food (including traditional food dehydration methods) dramatically affects the bioavailability of nutrients contained in the natural whole food. In many cases, the simple exposure of foods to high heat can severely affect the integrity and bioavailability of many important nutritional biochemical compounds of food, particularly when these compounds and nutrients are not naturally protected in the intact food matrix of the undisrupted whole food.

BRIEF SUMMARY

The following presents a simplified summary in order to provide a basic understanding of some aspects of various embodiments. The summary is not an extensive overview of the disclosure. It is neither intended to identify key or critical elements of the disclosure nor to delineate the scope of the disclosure. The following summary merely presents some concepts of the disclosure in a simplified form as a prelude to the more detailed description below.

Generally described, the present disclosure provides, in a first exemplary embodiment, a method of dehydrating fruit, comprising providing at least one cluster of fruit attached to stems and the stems attached to a branch; a first heating step comprising heating the least one cluster of fruit at a temperature in a range of 100-200 degrees F. for a period of time in a range of 1-24 hours; and a first curing step comprising allowing the at least one cluster of fruit to cool to room temperature over a period of time whereby dehydrated fruit is obtained.

In another exemplary embodiment, provided is a method of dehydrating fruit, comprising providing at least one cluster of fruit attached to stems and the stems attached to a branch; a first heating step comprising heating the least one cluster of fruit; a first curing step comprising allowing the at least one cluster of fruit to cool to room temperature; a second heating step comprising heating the cooled at least one cluster of fruit of the first curing step; and, a second curing step comprising allowing the heated at least one cluster of fruit of the second heating step to cool to room temperature whereby dehydrated fruit is obtained. The dehydrated fruit may have a water activity level of about 0.52. The dehydrated fruit may have a food matrix that is substantially maintained.

Other features will become apparent upon reading the following detailed description of certain exemplary embodiments, when taken in conjunction with the appended claims.

DETAILED DESCRIPTION

This alteration in bioavailability of nutritional compounds contained is particularly prevalent in the traditional method of processing fruits. The disruption the skin integrity of the fruit and the disruption of the natural pulp matrix with exposure of the fruit pulp tissue during industrial processing not only leads to water loss with the resultant loss of water-soluble nutrients, but also leads to the degradation of various important compounds (including bioactive nutrient compounds such as antioxidants, volatile esters, and polyphenols) through enzymatic change or oxidation of these compounds into inactive substances. The disruption of fruit skin integrity and of intact pulp matrix results in cellular decompartmentalization (i.e., the breaking down of the subcellular separation components present within an intact fruit matrix internal cellular structure).

The resultant exposure of bioactive compounds which are normally protected in the intact subdermal skin and pulp matrix of whole fruits to active but previously encapsulated intracellular enzymes results in the enzymatic degradation of these important nutritional compounds. Furthermore, the exposure of many important biologically active nutrients in the fruit pulp to the oxygen in air renders many of these compounds biologically inactive due to the effect of oxidative degradation. It is believed that leaving the fruit on its stem during processing has the potential of being able to concentrate the bionutrients existing in the stem itself by transmigrating nutrients from the stems/vine into the fruit pulp biomatrix utilizing the intact fruit/stem water transport system. By harnessing this natural water transport system and using it to concentrate the bionutrients through artificial processing with intact stems/fruit while removing water through pore evaporation, not only can fruit nutritional content be enhanced, but the stability and length of the final product's shelf life can be enhanced as well.

Grapes are one specific example of a fruit that has been commercially processed by industrial methods for many years to make raisins. The ideal grapes for commercial raisin production are thin-skinned, seedless grapes with high water content, high pulp-to-skin ratio, and relatively low pulp sugar content (e.g., 15% for Thompson seedless grapes). This fruit profile also represents the characteristics of most fruits (such as cherries, plums, apples, pears) that are desireable for traditional commercial dehydration methods. Grapes and other fruits used in commercial production are usually harvested by machines and then, where applicable, removed from the stems by machines (destemming) prior to processing or dehydrating. These processes result in the disruption of the natural connection of the fruit to the vine or to the plant stem. The destemming process exposes the fluid transport system (xylum, phloem) of the plant to oxygen and to airborne pathogens such as bacteria and fungi which immediately invade the fruit, starting the process of fruit decay/spoilage. In addition, conventional commercial fruit processing for dehydration involves further intentional disruption of fruit skin integrity, as most fruits are sliced into section (large fruits), or scored or punctured (small fruits), in order to allow excess liquid to exit the fruit during dehydration and hasten the dehydration process. Also, frequently, fruits that are harvested but require significant distance to transport for processing are cooled or even frozen to retard this decomposition and decay prior to processing. Freezing is known to damage or alter the bioavailability of many bioactive nutritional compounds.

During the traditional fruit dehydration process, heat (frequently above 200 degrees Fahrenheit) is applied to rapidly dehydrate and to kill the bacteria or fungi on the surface of the fruit/grapes in the process of becoming a dried fruit. It is generally known from the food science and medical literature that the bioavailability of certain soluble bioactive compounds found in fruits (such as antioxidants and polyphenols), are markedly affected by boiling (potentially in the area of 80% loss of bioavailability) or by exposure to high heat (potentially in the area of 65% reduction in activity).

These traditional methods of commercial preparation of fruits have a marked affect on certain bioactive nutrients in these fruits. One important example is the class of nutrients called polyphenols. The bioactive compound group of polyphenols include many bioactive compounds, such as, but not limited to, derivatives of benzoic acid and cinnamic acid, flavonols, flavonoids, stillbenes, lignans, anthocyanins, resveratrol, and the like. It has been widely published that certain compounds and antioxidants, like polyphenols, that are found in fruits have been linked to health benefits ranging from reduced cardiovascular risk, improved memory and brain function, reduced cancer risk, and prevention of other chronic degenerative diseases. These polyphenols are a large class of the biochemical nutrients that have been shown to have beneficial effects in humans, chiefly through the antioxidant properties of these compounds. These beneficial health effects of polyphenols have also been shown to be proportional not only to the volume consumed, but also to their bioavailability in the final food product. The most abundant polyphenols in the human diet are not necessarily those that have the best bioavailability profile. As stated previously, bionutrients such as polyphenols found in whole foods are very sensitive to degradation during the industrial harvesting, handling, processing and standard dehydration of the fruit.

In fact, the simple act of peeling fruit for commercial dehydration eliminates a significant portion of polyphenols because these substances are present in high concentrations mainly in the skins, and in the pulp matrix just under the skin, i.e., the subdermal region. Likewise, disruption in the subdermal region and pulp matrix by puncture, cutting, slicing, or scoring of the skin exposes these polyphenols to biodegrading enzymes in the subdermal fruit matrix and to oxygen which leads to rapid degradation of these polyphenols. The biodegradation of these compounds is what gives processed fruit the recognized pigmented brown color (e.g., raisins and other commercially dehydrated fruits). Because the brown color of processed fruits (and processed fruit juices) is undesirable to most consumers, most food processed in this traditional method must undergo a clarification or stabilization process which is specifically aimed at removing these oxidized polyphenols from the dehydrated fruit or juice responsible for this discoloration. Removal of these oxidized polyphenols by the stabilization process also removes these nutrients from the food. Likewise, any residual oxidized polyphenols remaining in the processed food are usually biologically inactive, or unavailable for health benefits. Once removed by oxidation or by stabilization, the loss of bioactive polyphenols dramatically decrease the antioxidant protective benefits attributable to the fruit or food.

The foods with particularly high bioavailable polyphenol content (commonly termed tannins) are fruits which are purple and red color, such as blackberries, blueberries, wine grapes and red wine. Once any of these polyphenol laden fruits are harvested and removed from their natural stem or the fruit skins integrity are disrupted in any way, almost immediately the polyphenol content within the fruit starts to diminish. This is due to loss of the water soluble phenol compounds through either the disrupted skins or the disrupted stem/fruit junction or through enzymatic degradation or oxidation. Almost immediately with exposure to air, oxidation of these compounds occurs and is enhanced with any further fruit maceration, cutting, scoring, puncturing, or skin disruption and concomitant resulting loss of water due to seepage that occurs during dehydration processing. Also, once fruit is removed from its stem at harvest or prior to processing, almost immediately the fruit begins to degrade from exposure to microbes and invasion into the fruit through the disrupted stem fruit connection and fruit skin integrity breach.

In contrast to most methods of commercial fruit processing (such as commercial fruit dehydrating) which results in loss of polyphenols, the art of winemaking represents a type of fruit processing specifically aimed at retaining polyphenols (tannins) during fruit processing. The whole process of winemaking from wine grapes attempts to retain and extract the biochemical activity (with its well-known health benefits) of polyphenols (tannins) from the grapes in making wine. In winemaking, wine grapes are harvested, de-stemmed, then crushed, with the resulting juice allowed to remain left, in contact with the skins and seeds during fermentation in order to extract the polyphenols from the stems and seeds. This extraction of tannins is felt to be enhanced by the alcohol formed from fruit sugars during the fermentation process. It is these polyphenols (tannins) which give red wine its color, aging ability, and its health benefits that are subscribed to wine. After fermentation, after the extraction of polyphenols (tannins) is felt to be complete the skins and seeds are discarded.

Wine grapes, though very high in polyphenol content, have never been felt to be useful as a food category because of the wine grapes' natural tendency for rapid spoilage (fermentation into wine). Wine grapes decay or ferment naturally because of yeast which lives on the outside of the fruit. Yeast present on the skin of the fruit normally immediately enters the grape after any skin/stem disruption. This leads to the grape pulp matrix breakdown and subsequent fermentation into wine. Also the wine grape as a fruit was felt to be unappealing as a food due to, handling difficulties, small fruit size, a thick bitter skin, high skin/pulp ratio, and the presence of many small, difficult to remove, bitter seeds. Wine grape seeds, though known to be high in polyphenols, have never been particularly palatable for human consumption due to their small size, hard shell and bitter tannic taste. It would be desirable to have a method of processing wine grapes and wine grape seeds which render them palatable and suitable for human consumption while enhancing and concentrating the nutritional substances found in raw wine grapes.

In exemplary embodiments, methods of dehydrating wine grapes and other foods are disclosed to maintain the amount, content, compartmentalization, and natural biochemical integrity of beneficial bioactive nutritional compounds, while concentrating these bioactive compounds during method of dehydration process.

Methods for successfully dehydrating wine grapes have not been successfully or commercially developed. Likewise, any wine grape dehydration was felt not to be possible due to various technical reasons including, but not limited to, the rapid degradation of wine grapes by natural grape skin yeast, thick wine grape skins, low initial fruit water content, high skin to fruit pulp ratio, large number of tannic seeds in the fruit with resulting astringency, high baseline sugar content in fruit with rapid conversion to alcohol (fermentation), variable but small fruit size, and inconsistent ability to predict water content of different grapes. It would be desirable to have a method of dehydrating wine grapes and other fruit and foods that would allow for water loss and dehydration of fruit which mimics nature while concentrating natural polyphenols in the fruit which could then be delivered in a natural biomatrix resulting in an excellent source of bioavailable polyphenols for human dietary use.

To achieve consistent and even dehydration, wine grapes should be processed quickly, with minimal grape skin disruption, still attached to stems, using a relatively low heat and high air flow in order to transpire water through the wine grape pores mimicking the natural water transport process while the fruit is on the vine. This is in contrast to the standard dehydration food processing methods currently employed where dehydration typically is done by water evaporation from liquid oozing from the fruit after stem removal, direct exposure to dehydration of fruit pulp with artificially created higher surface area accomplished by slicing, cutting, macerating or scoring of fruit.

Intact (i.e., with the stem) fruit dehydration can reduce or eliminate exposure of the fruit pulp and pulp matrix sugars to microbes thereby reducing or retarding the rapid fermentation of grape liquid. Allowing an intact fruit-stem connection allows continued capillary effect movement of water and water soluble nutrients (tannins) between the stem and the fruit pulp. Therefore, consistent controlled water loss only occurs through transpiration (with loss of fruit water only through grape pores via ambient pore evaporation) mimicking the water transport and drying process as would occur in nature "on the vine."

Exemplary embodiments of the method of dehydration may have the further effect of concentrating water soluble bionutrients like polyphenols in the dried pulp matrix and also allowing concentration of undisturbed/non-oxidized polyphenols in their intact subdermal cellular vacuoles, not exposing these bioactive compounds to degrading enzymes or oxidative degradation (since no oxygen was introduced due to the closed grape skin, intact grape, and grape-stem interface).

Harvest of wine grapes via hand or machine harvest is desirably done with minimal grape skin disruption. Wine grapes for wine are harvested usually at the desired sugar content (e.g., Brix>23%) and frequently as high as Brix 28-30% in higher quality wines to concentrate intensity of flavors, color, and tannins (polyphenols and bioactive compounds). Under normal growing conditions, wine grape sugar content or Brix level can only reach 23% in wine grapes by concentrating sugars produced by the vine. However, to achieve higher concentrations of sugar in the grape (i.e., greater than about 23 Brix) a loss of water content within the grape is required through a process called "transpiration."

Transpiration occurs naturally while the fruit is on the vine and results from movement of water via capillary action between the stem and the fruit and the leaves of the vine. Evaporation occurs from the leaves or through the grape skin pores in times of water stress. This allows the plant to alter and auto-regulate the water content and subsequent evaporation water from pores in fruit (low evaporation rate in times of high water stress) and leaves (higher evaporation rate in times of low water stress) by freely moving water content between the fruit to prevent or enhance evaporation based on environmental conditions. The present method for the first time artificially creates and harnesses in food processing the conditions that occur in the natural state while controlling the conditions for optimal concentration of bionutrients. Using principles of winemaking, it was observed that optimal wine grapes are harvested just beyond peak ripeness with beginnings of dimpling in the grape.

This dimpling of the wine grape suggests that the grape and vine have started to conserve water for plant survival in late summer and begun to transport free water back from the ripened grape back into the stem and vine for water conservation for the plant. The movement of free water from the grape back through the stem and branch into the plant also has the effect of concentrating the flavors, polyphenols, and other bioactive compounds, and raise the sugar content within the grape. This observed wine grape appearance is the winemaker's signal to begin harvesting grapes for wine production. In addition, in the vineyard management and production of many fine wines, a certain number of grape clusters (so called "green drop") are sacrificed several weeks before final harvest to allow the plant to concentrate its efforts to optimally ripen the few remaining clusters in order to concentrate and enhance flavors in the final wine product. The "green drop" grapes, i.e., the grapes that are cut from the vine, are partially ripened immature grapes (usually about <18 Brix sugar content) that are discarded as waste either to rot on the ground or be hauled away.

As a result of this water conservation by the plant and vine, there is a need for careful timing of harvest and frequently many grape clusters have exceeded optimal dimpling and shriveled to an unusable form. These wine grapes are left in the vineyard as refuse or cut and dropped to the ground. These are the "refuse vineyard wine grapes." Also, during the process of wine production, wine grapes undergo removal of stems (destemming), grape sorting of only appropriate sized and fullness by optical assessments on a sorting table or by mechanical optical sorting with inadequate grapes discarded as "sorting table refuse grapes." Finally, only the optimal grapes are crushed and fermented into wine. The refuse wine grapes go to waste and have no useful function other than refuse. The methods described herein represent a new opportunity of taking this otherwise vineyard industry waste product and turning it into a healthy snack that is both palatable and sustainable.

The methods described herein, although described in exemplary embodiments with respect to use with wine grapes, are applicable to fruits many other food products that grow on stems, allowing for a method for enhanced whole fruit ripening with concentration of bionutrients in the whole food biomatrix throughout complete process from harvest to final processing. Enhancements such as wine grape green drop processing include speeding up nature's natural ripening through a process and turning bitter unpalatable vineyard waste products into a sweet complex-flavored fruit with sweet caramelized grape seeds.

The examples are set forth for purposes of illustration only. Parts and percentages appearing in such examples are by weight unless otherwise stipulated.

Described herein in exemplary embodiments are new methods for intact food dehydration over a range of time and heat exposure which optimizes nutrient retention during the dehydration process and avoids or reduces the loss of biologically active nutrients due to degrading enzymatic and oxidative interactions. Furthermore, these methods allow for concentration of these biologically active nutrients during the dehydration process while maintaining the intact whole food matrix which is required for optimal human nutrient absorption and bioavailability.

Exemplary embodiments of the dehydration method this grape refuse to create a new healthy food product. A method has been developed to artificially mimic the process of nature in dehydration of wine grapes utilizing the process of transpiration with the resulting concentration of bioactive nutrients (polyphenols) and sugars within the wine grape during dehydration while also creating a method to utilize these refuse grapes. In addition to utilizing optimally harvested wine grapes, in this process we created a method for slowly drying all these grapes replicating the natural transpiration/pore evaporation process that nature exhibits which will allow for highly concentrated sugars, with minimal loss of water-soluble beneficial nutrients or antioxidant compounds. This was achieved by maintaining the internal grape/skin/stem integrity and internal water transport/exchange system intact for slow movement of water through the stem to the grape further concentrating nutrients in the intact grape with slow water loss only through the slow evaporation/transpiration process through the pores of each intact grape skin. In this way, a controlled method was created where water loss and concentration of bionutrients in grape and seeds would occur through the same process as occurs in nature with water transpiration from seed, to pulp, to skin pore for final evaporation.

In exemplary embodiments of the present method, various methods and conditions of heat exposure, time exposure, and circulation of warm air over grape surface (airflow velocity) were employed to determine optimal conditions to enhance the process of transpiration and pore evaporation, bionutrient concentration, and sugar concentration in intact unaltered wine grapes and wine grapes on stems. A wide variety of artificial drying conditions were applied to the intact fruit with a gradient of differing results based on experimental conditions. It was found that there was a need to account for the initial baseline point of water content within the pre-processed wine grapes depending on the degree of dehydration that had already occurred prior to beginning the processing. Several different categories were identified: plump full grapes, shriveled clusters from post-harvest vineyard refuse, imperfect wine grapes from sorting tables, and, clusters with grapes of varying size and water content all on one cluster. Preprocessing water content levels ranged from a high of 69% in full grapes and clusters to a low of 27% in shriveled vineyard refuse grapes. Wine grapes with lower baseline water content generally required lower heat and less exposure time than did wine grapes with higher baseline water content.

Test runs were done with clusters of grapes, i.e., grapes that were still attached to stems that were in turn attached to the branches that would attach to the vine. Test runs were also done on grapes attached to the stems, but where the stems were detached from the branch. Test runs were also done grapes from which the stems were removed (referred to as "de-stemmed grapes"); other runs used de-stemmed and scored grapes. Other runs used unripe and discarded "green drop" fruit. The best test results were obtained from clusters of grapes. Pores in the grape skin transmit water vapor to the ambient environment slowly, as do the stems. Scoring the skin caused transpiration to occur too quickly. Water transfer through the stem and branch evened out the dehydration of the entire cluster of grapes. It may be that the stems and branches act as a conduit of fluid from one grape to another grape, resulting in more even dehydration. Even unripe fruit (with pre-processing sugar content of 13-18 Brix including green drop fruit) had consistent enhanced concentration of bionutrients (post processing Brix levels of 67-70).

Various test runs were performed using un-destemmed grapes (i.e., grapes still attached to their stems), e.g., at 140 degrees F. for 24 hr (which yielded un-destemmed grapes having 39.47% water content). The un-destemmed grapes were allowed to cool to room temperature. The un-destemmed grapes were then heated again, this time at 170 degrees F. for 3 hr (which yielded 14.89% water content), but the results were too hard and crunchy. Grapes with stems, but off the branch, and not scored, yielded dried fruit that was still too crunchy and dried too quickly. This was particularly true with small lots of fruit and loose berry clusters put through the non-tunnel dehydration process. However, this over-dried fruit could be pressed into cakes and used. Tunnel dehydration with large lots and tight clusters of grapes required longer exposure times (15-20 hours) and sustained higher temperature (170-175 degrees).

Water activity ("AW") level is a measurement of the availability of water for biological reactions. The AW level is expressed as the ratio of the vapor pressure in the grape (or other food) to the vapor pressure of pure water. For example, AW level of 0.50 means the vapor pressure is 50% of that of pure water.

Sample baseline water content, and temperature and heat exposure times with final residual water content levels are shown in Table 1 below. Nutritional fiber was also demonstrated to be concentrated through this method from 1.4 grams per cup pre-dried to 5 grams per ⅓ cup post dried (with a 3:1 dehydration weight conversion equivalency ratio).

| Grape Varietal | Baseline Water Content (%) | Baseline Sugar Content (Brix %) | Dehydration Temp/Time (Fahrenheit) | Post-Treatment Water Content | Water Activity Level |
|---|---|---|---|---|---|
| Cabernet | 70% | 26-30 | 140/1 hr; then 150/2 hr; then 180/6 hr | 16-18 | Ranged from 0.47-0.6 |
| | | | 140/24 hr | 30.4 | |
| | | | 110/23 hr | 50 | |
| | | | 140/24 hr; then 170/3 hr | 14.9 | |
| | | | 200/.3 hr; then 165/8 hr | 19 | |
| | | | 180/8 hr small lot | 18-23 | 0.52 |
| | | | 120/24 hr; then 170/4 hr | 59; 22.4 | |
| | | | 130/24 hr; then 170/4 hr | 55.3; 23.2 | |
| | | | 200/30 min; then 170/8 hr* | 15 23.7 | |
| | | | 170/15 hr large lot | 18-23 | 0.50 |
| Chardonnay | 66% | 23 | 200/0.3 hr; then 165/8 hr | 19.2 | |
| | | | 180/8 hr | 20-22 | 0.48 |
| Chardonnay/ Merlot | | | 170/15-20 hr | | |
| Merlot | 65% | 23-25 | 165/1 hr; then 185/5 hr | 26 | 0.52 |

*more fruit added for ambient pore transpiration

Heating over about 200 degrees F. for more than about 30 minutes tended to destroy the fruit matrix and caramelize the sugars. Heating under about 110 degrees F. for up to 24 hours did not effectively reduce water content to levels required for storage. In exemplary embodiments, the optimal time was about 180 degrees F. for 8 hours. Samples included grapes left on the stems.

In large lots of production (e.g., greater than 10 tons per processing run) it was noted that longer exposure times (10 to 24 hours in initial session) were required with generally moderately lower temperatures (160-175 degrees F.). In exemplary embodiments, the optimal time was about 170 to 175 degrees F. for 15 to 20 hours. In exemplary embodiments, trays were turned once (optimally, after 90 minutes of initial exposure) to allow for reversing of air flow.

Alternative exemplary methods that proved acceptable were accomplished through varied intermittent exposure to heat and then allowing some period of cooling to ambient temperature (allowing further slow curing with continued loss of water thru trans-pore evaporation) with subsequent re-exposure to heat. This process allowed heat exposure for 20-24 hours at temperatures in a range of about 170-175 degrees F. Different types of grape clusters and grape varietals optimally required different optimal settings and curing periods. These methods were particularly effective with tight full berry clusters where some initial berry shrinkage was required to allow and expose heat and airflow to inner berries of the cluster without overcooking the outer berries. This allowed trans-pore evaporation of the entire cluster to occur consistently and slowly.

Wine grape varietals such as certain chardonnay and cabernet sauvignon, are particularly prone to tight clusters and processing is enhanced by heat exposure followed by cure, followed by heat exposure followed by cure, sometimes over a period of days. In exemplary embodiments of the method, a minimum of about 40 minutes between heat exposure runs to a maximum of about 10 days between heat exposure runs with cure in between each heating step. The grape varietal had some impact in optimal cure times. In exemplary embodiments, a cure time of 1 day for cabernet and merlot and 2-4 days for chardonnay was used. Rotation of the grape clusters, by turning the fruit over while on drying trays or in curing bins, also enhances the speed of the slow cure between heat exposure runs, especially when heat exposure is several days apart. The amount of heat and duration of heating exposure on the second or third heat exposure runs were less than the initial heat exposure/time. In exemplary embodiments, the second and subsequent heat exposure runs were accomplished in optimally half-full MACROBIN™ container bins with slits for airflow. In one exemplary embodiment, the second heat runs was for 3 hours at 160 degrees F. with fruit being turned in the bins at 1.5 hours.

With scraping of trays some damage occurred to individual grape skin integrity. These grapes were set aside on post-processing optical sorting and cluster shaker tables designed for this process. The set aside fruit was then pressed into balls or cakes as a sustainable practice and placed in cold storage. These were subsequently used to create fruit pressed snacks and/or enrobed in chocolate.

During the testing, various airflow rates did not seem to be a major factor in determining desired optimal final water content level though a minimal flow of air current over the fruit surface is required for the transpiration process to occur. At one end of the testing spectrum 110 degrees F. for 24 hours was not acceptable. In exemplary embodiments, a temperature range of 120-200 degrees F. appeared to produce acceptable results, depending on the time. Temperatures below 100 degrees and above 200 degrees F. often resulted in failure to produce usable product. Above about 200 degrees F. resulted in charred fruit at >200 degrees F. and mushy water-laden fruit at <100 degrees F. These results were consistent and accomplished using both large scale production tunnel dehydrators as well as smaller commercial Harvest Saver™ dehydrators. Various time/heat exposures yielded acceptable results with final desired residual water content levels of about 16-23%. In exemplary embodiment the conditions of exposure were for 180 degrees for 6-8 hours, resulting in final dehydrated fruit residual water content of 18-23% and AW of 0.52 (for certain conditions, an AW level below about 0.85 is desired for prolonged stable shelf life). This resulted in optimal sugar content, flavor profile, and consistent mouth feel, by as tested by blind panel testing.

A surprising finding, and potentially an important factor in obtaining consistent results, was that during dehydration the stem to wine grape connection was maintained and actually strengthened. The stems dried faster and allowed for transfer of water between grapes within clusters creating homogeneous dehydrating among grapes of different beginning water content while concentrating bionutrients from the stems into the intact dehydrated grapes. Also during the process, wine grapes largely remained in clusters with intact connections to the vine. Furthermore, the variation in heat/time exposure for different preprocessing water activity level and baseline wine grape appearance (shriveled, dimpled, single clusters, plump) or wine grape source (vineyard refuse grape clusters, sorting table refuse grapes, or normal plump grape clusters) were normalized by mixing wine grape types on drying trays allowing fruit to transfer water content from fruit with high water to low water content. An equilibrium of water transfer between wine grapes occurred through not only stem transpiration within clusters of connected fruit, but through exchange of water content between unconnected fruit. This is known as "transambient transpiration" i.e., water content transfer during dehydration through the grape pore evaporation and ambient humidity exchange between unconnected or single fruit of varying degrees of water content. We termed this newly observed process as "pore transfer ambient transpiration." This unique method of dehydration of intact wine grapes and attached to their stems as well as mixing grapes of varying preprocessed water content on drying trays led to consistent results of optimal dehydration of intact fruit with concentration of flavors, sugars, nutrients, bionutrients and oxidants with the only loss of water content through inter-stem grape-water transfer and pore ambient transpiration.

Without wishing to be bound by any particular theory, it may be that the amount of bionutrients, e.g., phenol, are increased in the grape beyond what is normally in the undried grape because of the movement of bionutrients between the branch, stem and grape. It may also be that the concentration of bionutrients in the grape increases based on the removal of water. With the methods disclosed herein, the fruit skin is not disrupted (e.g., by scoring, puncturing, or the like), which may result in lower loss of bionutrients during the drying process.

Exemplary embodiments of the present method allows for uniformity and consistency of final fruit water activity level without having to account for pre-processing water activity level while allowing for the concentration of nutrients within the dehydrated fruit including the beneficial phenolic compounds present in the intact fruit and stems. The methods disclosed herein can be adapted and applied to other fruits and foods with commensurate results. Other food items that may be dried using the methods disclosed herein or adaptations thereof include, but are not limited to fruits, such as cherries, plums, apples, apricots, figs, dates, cranberries, other berries, radishes, and the like.

Post-processing methods also included the ability to sort free berries from clusters using a shaker table with varying sizes of grate holes as well as optical sorting to define berry consistency post processing. It was also found that the berries could be safely de-stemmed post-dehydration without degradation and still maintain concentrated nutritional content and desirable shelf life, as long as water activity level post-processing is below, in certain exemplary embodiments, 0.85, and, in other exemplary embodiments, below 0.70. Optimally, post-process de-stemmed fruit should be packaged in air tight packaging soon after destemming or enrobed in chocolate to retard prolonged ambient air exposure. Covering in chocolate seemed to enhance the preservation of bionutrient profile of wine grapes particularly post-processed damaged or destemmed wine grapes.

Little goes to waste using the methods disclosed herein. Even overly dehydrated wine grapes or intentionally over-dried skins, stems and seeds can be used. The products can either be used directly as a whole food additive, or rehydrated during the process of making the new food preparation (such as, but not limited to, cookies, jam, cakes, ice cream, sauces, baked goods, cereals, milkshakes, or the like), or reconstituted as an additive to non-alcoholic juice, water, carbonated beverages, or the like, or with wine itself, to enhance flavor of wine grapes and health benefits of the wine grape reconstituted product to any food or beverage. Furthermore, the overdried or redried product (optionally including other byproducts, such as loose skins, seeds and stems) can be further ground into powder or wine grape flour and used likewise as or in a food, beverage or aromatic non-food device additive in order to add wine grape aromatics, flavor and polyphenols to the subsequently produced product. Further exemplary uses for such ground wine grape powder are, for example, but not by way of limitation, for use as additive for candles (aromatics), oils (aromatics, flavor, and health benefits), bath salts or oils (aromatics and health benefits), lotions, skin care products and make up (aromatics, flavors and health benefits through skin absorption), and for concentrated means for transdermal delivery for biologic activity of the concentrated health benefits within wine grapes (polyphenols, anthocyanins, stilbenes, and even trace element biologically active compound found in wine grapes and seeds). Other exemplary embodiments include methods disclosed herein being used with other byproducts of the production process of wine grapes (lees, skins, seeds, stems from winery destemming, or other byproducts from wineries) all used as above to create sustainable methods of adding the aromatics, or the flavors, or the health benefits of wine grapes, or all of these to other produced consumable or non-consumable products.

Dehydration of wine grapes uses a different process due to the thick skins and seeds and small size as well as sugar content.

Adequate process for dehydration of wine grapes is unknown and untested.

Wine grapes have concentrations of complex phenolic compounds which would be denatured and lost from the fruit by improper handling and by the standard commercial dehydration process.

Wine grape phenols have been shown to have many health benefits including antioxidant properties and cardiovascular benefits.

Likewise wine grape seeds and stems possess similar poly-phenolic compounds (tannins) which have been shown to have health benefits, but heretofore have been difficult to extract and process in suitable form for human consumption Wine grapes and post-harvest wine grapes left on the vine have different initial levels of preprocessing water content prior to entering the drying process leading to a inhomogeneous starting point for dehydration and requiring potentially different drying formulas for processing and dehydration.

The whole winemaking process revolves around extracting sugars, bionutrients, and tannins(polyphenols) from wine grapes thru a complex and indirect process called fermentation.

Wine makers have used many complex processes during winemaking to extract these poly-phenolic compounds (tannins) to enhance the color and flavor profile of wine. This includes destemming and crushing the grapes, chemical fermentation with the skins and seeds (lees) admixing these lees through the liquid during fermentation and aging of wine all in an attempt to extract as much of the polyphenolic compounds as possible to enhance the taste and lengthen wine bottle shelf life (aging of wine). However due to the biochemistry and location of these polyphenol compounds which are mainly located in the subdermal skin and seeds of the wine grape, this process is inconsistent and difficult.

Likewise, wine grape seeds are known to have very high polyphenol content and have been used and crushed to extract wine grape seed oil for its health benefits and to be included in products that promote health.

Conventionally, extraction and acquisition of polyphenols from wine grapes has been by disruption of wine grape integrity way to extract the health benefits of wine phenolic compounds. No method existed for processing wine grapes while maintaining complete fruit integrity while not destroying, discarding, or denaturing the polyphenolic compounds during the processing method.

Destemming of wine grapes has long been used in the first step in the process of wine making or in raisin production for seedless grapes harvested for that purpose. The destemming process disrupts the grape from the stem and allows loss of the water content of the grape and exposes the pulp matrix to degrading enzymes and microorganisms. Likewise, any disruption in the wine grape skins or pulp matrix hastens this process.

The process of dehydration of wine grapes, which are intact, without skin disruption, and attached to the stems, allows for no loss of liquid containing the beneficial phenolic compounds, and allows for exchange of water content (transpiration) between the intact stem and wine grape similar to what occurs in nature. This process has never previously been duplicated in the commercial processing of wine grapes or other fruits. This new processing method allows for water content transfer and concentration of the beneficial phenolic compounds throughout the process of dehydration. No prior method of this process has been previously described which allows for this ambient pore transpiration allowing for concentration of bioactive nutrient compounds during the dehydration process.

The ability to successfully dehydrate wine grapes including seeds from varying states of pre-dehydration water content to achieve consistent dehydrated end product while maintaining consistent mouth feel and concentration of heathy phenolic compounds and other bionutrients has been demonstrated. Exemplary embodiments of the disclosed method was achieved over a wide range of temperatures (100-200 degrees F.) and a wide range of time exposures (1 hour-24 hours) using large scale tunnel dehydrators and medium and small sized commercial stand-alone dehydrators.

This process was accomplished on intact wine grapes without separation from the stem through stem-grape ambient pore transpiration. This is the first time this has been accomplished on a commercial scale.

The normal process during commercial dehydration requires some degree of disruption to the intact skin of the fruit being dehydrated (by scoring, slicing, cutting, puncturing, stem removal) in order to expose the water laden central fruit material and intense surface area exposure to airflow hastening the dehydration. This loss of water content via oozing of water and evaporation also results in loss of water soluble compounds contained in the fruit. Our novel new process of intact fruit dehydration (with the intact skins and retained seeds), while also attached to the stems requires dehydration to occur through the natural skin pores "ambient pore transpiration," which prevents loss of water soluble compounds and sugars while concentrating the compounds and sugars in the remaining solid fruit material being dehydrated. The intact attachment to the stem during dehydration allows for stem-fruit transfer of water with capillary osmotic homeostasis between the fruit and stem. This movement of water and water soluble tannins freely between the stems and fruit during dehydration ultimately concentrates the water soluble bionutrient compounds in the fruit since the stems dry quicker and more completely than does the fruit. The bond connection adherence between the fruit and stem becomes stronger during this process as water content of both the stem and fruit lost and physical pressure of the water laden fruit is not attempting to loosen and ultimately detach the fruit from the stem. The present method provides the benefit of retaining bioactivity due to the food matrix remaining substantially intact. This phenomenon is exactly opposite as what would be seen in nature where fruit of peak ripeness and maximum water content detaches the connection between stem and fruit resulting in the ripening of the fruit falling off the stem, (i.e. apple, peach, grape at peak ripening) of the tree or vine at the time of harvest.

The following numbered clauses include embodiments that are contemplated and non-limiting Clause 1. A method of dehydrating fruit, comprising: providing at least one cluster of fruit attached to stems and the stems attached to a branch; a first heating step comprising heating the least one cluster of fruit at a temperature in a range of 100-200 degrees F. for a period of time in a range of 1-24 hours; a first curing step comprising allowing the at least one cluster of fruit to cool to room temperature over a period of time whereby dehydrated fruit is obtained, wherein the dehydrated fruit has a water activity level of about 0.52, and wherein the dehydrated fruit has a food matrix that is substantially maintained.

Clause 2. The method of claim 1, wherein the fruit is cabernet fruit, wherein the first heating step temperature is 180 degrees F., and wherein the first curing step is for a period of 8 hours.

Clause 3. The method of claim 1, wherein for an amount of clusters of fruit of at least 10 tons in a single processing run, the first heating step temperature is in a range of 160-175 degrees F., and the first curing step is for a period in a range of 10-24 hours.

Clause 4. The method of claim 1, wherein for an amount of clusters of fruit of at least 10 tons in a single processing run, the first heating step temperature is in a range of 170-175 degrees F., and the first curing step is for a period in a range of 15-24 hours.

Clause 5. The method of claim 1, wherein the at least one cluster of fruit is provided on at least one tray and wherein the at least one tray is turned at least once during the first heating step.

Clause 6. The method of claim 1, wherein the at least one cluster of fruit is rotated or turned over at least once during either the first heating step, the first curing step or during both the first heating and first curing steps.

Clause 7. The method of claim 1, wherein the dehydrated fruit has a residual water content in a range of 16-23%.

Clause 8. The method of claim 1, wherein the first heating step is at a temperature of 100 degrees F. for a period in a range of 6-8 hours, and the dehydrated fruit has a residual water content in a range of 18-23% and a water activity of 0.52.

Clause 9. The method of claim 1, wherein the fruit comprises wine grapes.

Clause 10. A method of dehydrating fruit, comprising: providing at least one cluster of fruit attached to stems and the stems attached to a branch; a first heating step comprising heating the least one cluster of fruit; a first curing step comprising allowing the at least one cluster of fruit to cool to room temperature; a second heating step comprising heating the cooled at least one cluster of fruit of the first curing step; and, a second curing step comprising allowing the heated at least one cluster of fruit of the second heating step to cool to room temperature whereby dehydrated fruit is obtained, wherein the dehydrated fruit has a water activity level of about 0.52, and wherein the dehydrated fruit has a food matrix that is substantially maintained.

Clause 11. The method of Clause 10, wherein the total time of the heating steps is in a range of 20-24 hours and wherein the temperature range during the heating steps is in a range of 170-175 degrees.

Clause 12. The method of Clause 10, further comprising at least one set of additional heating-curing steps after step e) comprising heating the at least one cluster of fruit and then curing the at least one cluster of fruit.

Clause 13. The method of Clause 12, wherein the time between the two successive heating steps is at least 40 minutes and less than 10 days.

Clause 14. The method of Clause 10, wherein the temperature is lower and duration of each heating step shorter after the first heating step.

Clause 15. The method of Clause 10, wherein the second heating step was at 160 degrees F. for 3 hours.

Clause 16. Dehydrated fruit produced by the method of Clause 1.

Clause 17. Dehydrated fruit produced by the method of Clause 10.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

All patents, applications and publications referred to herein are incorporated by reference in their entirety.

What is claimed is:

1. A method for treating seeded wine grapes to make seeds thereof edible, comprising:
    providing at least one cluster of seeded whole wine grapes removed from a vine substantially free of cracked skin and containing seeds and a pulp matrix, having skin which is substantially intact, the seeded whole wine grapes being attached to stems and each of the seeded whole wine grapes having a seed therein;
    heating, using tunnel dehydration, the at least one cluster of the seeded whole wine grapes at a temperature in a range of 135-200° F. for a period of time in a range of 1-24 hours so that water is transmitted substantially only from an interior of the grapes through the skin and through the stems so to at least partially dehydrate the at least one cluster of the seeded whole grapes, and render the seeds of the seeded whole wine grapes into an edible condition as within the seeded whole wine grapes; and
    curing the at least one cluster of seeded whole grapes by allowing the at least one cluster of the seeded whole grapes to cool to room temperature over a period of time in an unsealed container such that a skin of grapes of the at least one cluster of the seeded whole wine grapes is exposed to ambient air while the pulp matrix is not exposed to air, whereby dehydrated seeded whole wine grapes are obtained,
    wherein the seeded whole wine grapes as dehydrated and cured have a water activity level of about 0.52, skin that is substantially intact, a pulp matrix containing edible seeds that is substantially maintained, and the stems still attached.

2. The method of claim 1, wherein the seeded whole wine grapes are cabernet grapes, the temperature is in a range of 160-185° F., and the period of time is 8 hours.

3. The method of claim 1, wherein the at least one cluster is a plurality of clusters of the seeded whole wine grapes and an amount of the clusters of seeded whole wine grapes is at least 10 tons in a single processing run, and the temperature is in a range of 160-185° F. for a period in a range of 10-24 hours.

4. The method of claim 1, wherein the at least one cluster is a plurality of clusters of the seeded whole wine grapes and an amount of the clusters of the seeded whole wine grapes is at least 10 tons in a single processing run, and the temperature is in a range of 160-185° F. for a period in a range of 15-24 hours.

5. The method of claim 1, wherein the at least one cluster of the seeded whole wine grapes are rotated or turned over at least once during heating, curing, or both.

6. The method of claim 1, wherein the seeded whole wine grapes as dehydrated have a residual water content in a range of 17-23%.

7. The method of claim 1, wherein the period of time is in a range of 6-8 hours, and, after curing, the seeded whole wine grapes as dehydrated and cured have a residual water content in a range of 18-23% and a water activity of 0.52.

8. The method of claim 1, wherein the seeded whole wine grapes are chardonnay grapes.

9. The method of claim 1, wherein the seeded whole wine grapes are merlot grapes.

10. A method for treating seeded wine grapes to make seeds thereof edible, comprising:
    removing at least one cluster of seeded whole wine grapes from a vine such that the seeded whole wine grapes are substantially free of cracked skin, the seeded whole wine grapes having a pulp matrix and skin that is substantially intact, the seeded whole wine grapes as removed being attached to a stem and each of the seeded whole wine grapes having a seed therein;
    applying air using a dehydration device to the at least one cluster of the seeded whole wine grapes at a temperature in a range of 135-200° F. for a period of time in a range of 1-24 hours whereby water is transmitted substantially only from an interior of the grapes through the skin and through the stem so to at least partially dehydrate the at least one cluster of the seeded whole grapes, and render the seeds of the seeded whole wine grapes into an edible condition as within the seeded whole wine grapes and concentrating nutrients in the pulp matrix, the nutrients comprising water-soluble tannins; and
    curing the at least one cluster of seeded whole grapes by allowing the at least one cluster of the seeded whole grapes to cool to room temperature over a period of time in an unsealed container such that a skin of grapes of the at least one cluster of the seeded whole wine grapes is exposed to ambient air while the pulp matrix is not exposed to air, whereby dehydrated seeded whole wine grapes are obtained,
    wherein the seeded whole wine grapes as dehydrated and cured have a water activity level of about 0.52, skin that is substantially intact, a pulp matrix containing edible seeds that is substantially maintained, and the stem still attached.

11. The method of claim 10, wherein the dehydration device is a tunneling device.

12. The method of claim 10, wherein the temperature is in the range of 160-185° F., and the period of time is 15-20 hours.

13. The method of claim 10, wherein the seeded whole wine grapes are at least one of: merlot grapes; cabernet grapes; and chardonnay grapes.

14. The method of claim 11, wherein the temperature is in the range of 160-185° F., and the period of time is about 8 hours.

15. The method of claim 11, further comprising:
    prior to heating and curing, positioning the at least one cluster of the seeded whole grapes on a tray; and
    turning the tray at a predetermined period of time during the heating process, thereby reversing air flow applied to the at least one cluster of the seeded whole grapes.

16. The method of claim 15, wherein the predetermined period of time is after 90 minutes.

17. The method of claim 15, further comprising, after curing, re-heating the at least one cluster of the seeded whole grapes for 20-24 hours using the tunneling device at a temperature in a range of about 170-175°, wherein the re-heating is performed between about 40 minutes after the heating to about 10 days after the heating.

18. The method of claim 15, further comprising enhancing a speed of the curing by turning the at least one cluster of the seeded whole grapes over on the tray.

\* \* \* \* \*